United States Patent Office 3,429,135
Patented Feb. 25, 1969

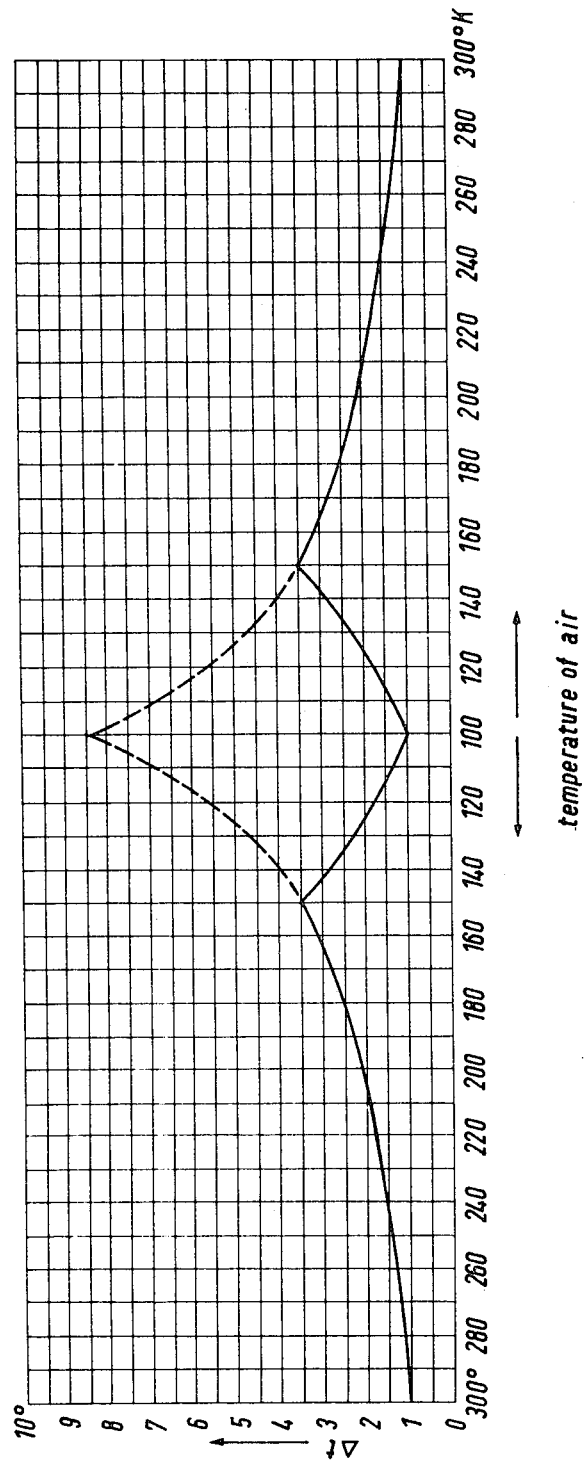

3,429,135
DOUBLE-FLOW REGENERATOR
Günther Rückborn, Munich-Grunwald, Friedl Donhauser, Amberg, and Johann Huber, Grosshesselohe, near Munich, Germany, assignors to Linde Aktiengesellschaft, Wiesbaden, Germany
Filed Dec. 17, 1965, Ser. No. 514,612
Claims priority, application Germany, Dec. 19, 1964, G 42,321
U.S. Cl. 62—13                9 Claims
Int. Cl. F25j 5/00, 3/08

ABSTRACT OF THE DISCLOSURE

In a double-flow regenerator, the provision of heat exchange coils in the coldest portions of the regenerator, near the central outlet, and the use of cool, clean air withdrawn from the regenerator as a heat exchange fluid through said coil so as to warm said fluid to avoid the liquid phase during a subsequent expansion step of said fluid, and at the same time, providing a regenerator temperature profile wherein small temperature differences between the regenerator and fluids flowing therethrough are obtained in both the warm and cold portions thereof.

---

This invention relates in general to double-flow regenerators used in cooling and cleaning impurity containing warm gases and more specifically, to improved double-flow regenerators in which the removal of impurities, condensed therein can be more readily effected.

In conventional regenerators of this type such as, for example, in U.S. Patent No. 2,735,278, efficient operation at high heat transfer rates is unattainable with small temperature differences between the gas being cooled and the gas being warmed in a subsequent cycle at the cold center of the regenerator. The great differences in temperature at the center of the conventional regenerators are due to the fact that the gas to be cooled has a specific heat greater than that of the gas to be warmed which is under approximately atmospheric pressure in consequence of the higher pressure, especially at low temperatures, of the gas to be cooled. This means that in the case of the known double-flow regenerators by indirect heat-exchange between the gas to be cooled and the gas to be warmed the temperature of the gas to be warmed is raised to a higher degree than the temperature of the gas to be cooled is reduced. Consequently, especially in the center of the regenerator a great temperature difference is produced. However, small temperature differences between the warm gas being cooled and the cold gas being warmed at the coldest discharge end of the regenerator are particularly desirable since under such operating conditions the impurities deposited therein can be more effectively and completely removed during the cold cycle. That is, the temperature of the coldest discharge end of the regenerator will be slightly lower when normally operating with such small temperature differences and hence the condensed impurities will more readily vaporize when the regenerator is recooled.

Operation of the desired type is usually achieved in simple regenerators, by either withdrawing a part of the gas to be cooled and cleaned from the cold portion of the regenerators, or else, by providing warm-up coils in the cold portion of the regenerators to reduce the temperature of the cold portion of the regenerator. In the former process, additional equipment is needed since the withdrawn portion of gas to be cooled and cleaned from the cold portion of the regenerators must be cleaned, in special apparatuses, such as, for example, two gel adsorbers for $CO_2$. In the latter process utilizing heating coils, a fluid must be available and supplied thereto at a predetermined temperature. However, the above-described innovations are not applicable to the more complex double-flow regenerators and it is therefore desirable to provide such a regenerator which is capable of effectively operating with small temperature differences at the cold center thereof and from which the deposited impurities can be completely removed ("self-cleaning principle").

At the same time, it is also desirable to warm a cold, cleaned gas to be expanded in a turbine to such an extent that it will not subsequently be expanded into the liquid-vapor region in the turbine.

It is, therefore, a principal object of this invention to provide an improved double-flow regenerator capable of effectively operating with small temperature differences at its coldest center.

It is another object of this invention to provide an improved double-flow regenerator to cool and clean an impurity-laden gas and simultaneously heat a cool, clean gas which is to be expanded.

It is still another object of the invention to provide an improved double-flow regenerator having improved heat transfer characteristics and from which the impurities condensed therein can be completely removed during the cold cycle.

These and other objects and advantages of this invention will become apparent by reference to the following description, claims, and drawings appended hereto.

It has now been found possible, in accordance with the present invention, to improve the operating characteristics of a double-flow regenerator and simultaneously preheat a cooled clean gas prior to expanding the same in a turbine by passing the gas through coils embedded in the coldest portions of the regenerator. These coils lie both above and below the common inlet and outlet for cold gas. Since both incoming and outgoing cold gases flow through this common duct, the portions of the regenerator above and below this common duct in which the coils are embedded are at the lowest temperature during normal operation.

By means of the cold cleaned gas flowing through the pipe coils additional cold is supplied to the regenerator. This method makes it possible to approximately balance the situation given by the different specific heats of the gas to be cooled and that to be warmed, so that there are left only temperature differences on the order of about 1 degree in the center of the regenerator. Consequently, the impurities are deposited during the warm cycle at almost the same temperature at which they are vaporized during the cold cycle.

In addition to the advantages provided in adjusting the temperature of clean gas being supplied to an expansion engine, the circulation of this same gas through the coils in the regenerator changes and improves the normal temperature profile therein. When the double-flow regenerator is operated in accordance with this invention, relatively small temperature differences occur between the gas being cooled and the gas being warmed at both the warm ends and cold center portion. Thus, with the double-flow regenerator of the present invention it is now possible to completely re-sublime the impurities deposited in the regenerators during the warm cycle, and also adjust the inlet temperature of a cold turbine gas thereby to avoid the expansion thereof into the liquid-vapor region.

According to one embodiment of this invention, a portion of the cooled, cleaned gas discharged from the regenerator is introduced in the coil inlet whence it is passed substantially counter-currently to the gas being cooled and cleaned in the regenerator. Thus, the gas is passed upwardly through the pipe coils in the upper portion of the regenerator and downwardly through the pipe coils in the lower portion of the regenerator. Although it is convenient to utilize in the coils a portion of the cooled, clean gas effluent from the regenerator, gas from any other source can be passed through the coils.

Since double-flow regenerators operate more effectively when the gas flowing therethrough is uniformly distributed, the heat storage particles within the regenerator must be uniformly distributed therein. The pipe coils are accurately positioned within the regenerator as hereinafter described to permit heat storage bodies to be uniformly distributed throughout the regenerator. To accurately secure the pipe coils in predetermined positions in the regenerator, mounting means connected to the inner wall of the regenerator are provided.

In accordance with another embodiment of the invention, the pipe coils are spaced about a short inner conduit positioned concentrically about the longitudinal axis of the regenerator. The inner conduit is fixedly connected at its lower end to radial support means, i.e., girders or trusses, extending radially from the circumference of the inner conduit to the regenerator wall where they rest on angular support means. Desirably, the outer ends of the radial support means are connected by a ring. The lower end of webs extending vertically upwardly are affixed to the radial support means and branches of the pipe coils are affixed to and carried on these webs.

It has been found preferable to space the webs apart a distance such that heat storage particles can fall through the regenerator between the individual pipe coils, and uniform distribution of these particles in the vicinity of the pipe coils can be obtained. The heat or cold storage bodies used to fill the regenerator can comprise particles of any material having a high heat conductance and preferably, metal or stone particles are used.

To improve the uniformity of particle distribution in both sections of the regenerator, the coils are arranged such that corresponding parts thereof are positioned above and below the inlet and outlet, respectively, and the coil mountings are likewise arranged vertically below or above one another.

There are also provided spacer means which assist in fixing the pipe coils a predetermined distance from the regenerator wall. These spacer means are fixedly connected to a narrow ring which is to be concentric about the longitudinal axis of the regenerator. This ring, in turn, connects the webs closest to the regenerator wall.

Further details and advantages of the invention can be seen from the embodiment schematically illustrated in the drawings in which:

FIGURE 4 is a diagram in which the temperature differences in a known double-flow regenerator are compared with the temperature differences in a double-flow regenerator according to the invention, plotted against the distance between the cold center and the warm ends of the regenerator.

Figure 1:
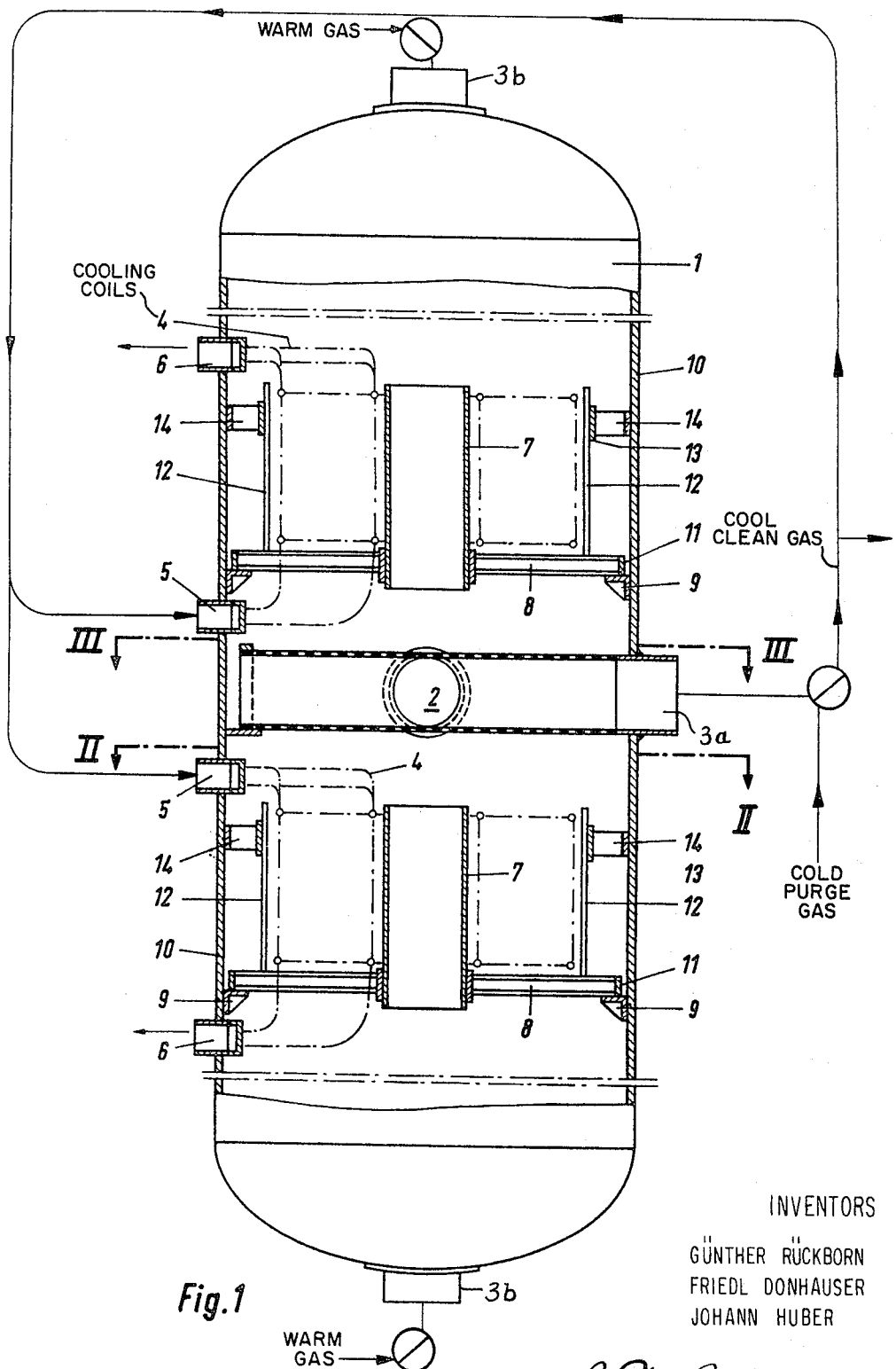
FIGURE 1 is a partly broken away sectional view of a double-flow regenerator according to this invention.

FIGURE 1 shows a double-flow regenerator generally indicated at 1. Both incoming cold gas, and outgoing cooled and cleaned gas, respectively, are passed through perforated pipe cross 2 having an open end 3a. The pipe cross 2 can be fabricated from sheet metal or any other like material having sufficient structural rigidity to withstand the weight of the heat storage material resting thereon. Pipe coils 4, shown in partly broken lines, are positioned both above and below the cold gas inlet 3a and warm gas inlet and outlet 3b.

Figure 2:
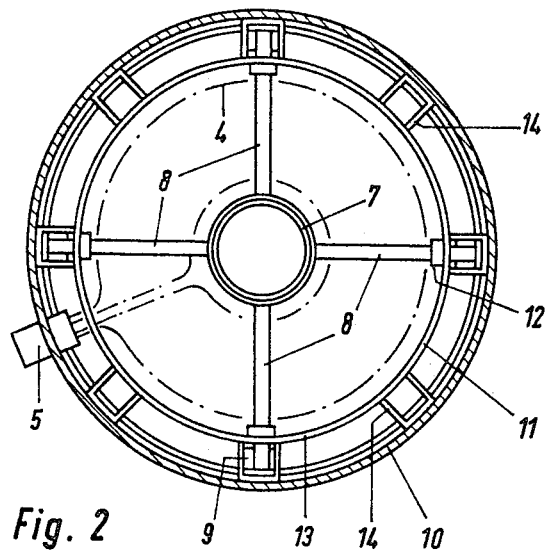
FIGURE 2 is a sectional view taken along line II—II in FIGURE 1 and showing the internal construction of the upper section of the lower half of regenerator.

Cool, clean gas flows into inlet 5, through the pipe coils 4, and discharges from the regenerator through outlet 6. The inlets and outlets of the coils are positioned exactly vertically below one another. The pipe coils 4 are also arranged concentrically about inner conduit 7 which is fixedly connected to four trusses 8 provided in the form of a cross (FIG. 2). The trusses 8 rest on angular supports 9 fixedly secured to the regenerator wall 10, and a ring 11 connects the outer ends of the trusses.

A plurality of webs extending vertically upwardly are mounted on trusses 8, and the individual branches of pipe coils 4 positioned one below the other are fastened to these webs. The pipe coils can be fastened to the webs, for example, by means of clamps or other like means welded to the webs. Only the illustrated outer webs 12 are embraced by and connected to ring 13. Between ring 13 and the inside wall of the regenerator, eight U-shaped spacers 14 are mounted. In their normal position, spacers 14 leave a small free distance between the regenerator wall 10 and outer web 12. It is also important to arrange these spacers uniformly around the inside of the regenerator.

FIGURE 2 shows the cross shape of the trusses 8. Eight U-shaped irons 14 serve as spacers between the ring 13 and the regenerator wall 10. Again, only the outermost webs 12 are illustrated.

Figure 3:
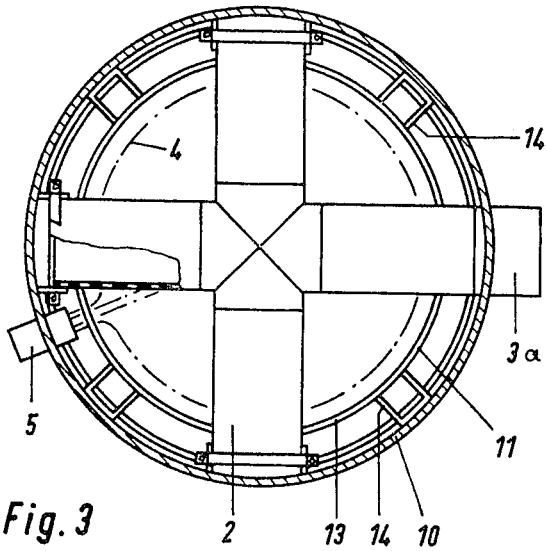
FIGURE 3 is a section taken along line III—III through the regenerator of FIGURE 1, and especially illustrating in a partly broken away section a perforated inlet line thereto.

In FIGURE 3, the configuration and shape of the pipe cross 2 of perforated sheet metal can be seen. It is through this cross that the cold gas enters and the cooled and cleaned gas exits.

In FIGURE 4 the left end and the right end of the abscissa designate the two warm ends, whereas in the middle of the abscissa there is the cold center of the regenerator. The solid curve shows the temperature differences in a regenerator according to the invention in case the amount of gas which is cooled equals the amount of gas which is warmed. At both warm ends the temperature differences are small, becoming greater towards the middle of the regenerator until a point is reached where the temperature of the gas being cooled amounts to approximately 150° K. On and after this point additional cold is supplied to the regenerator by means of the gas flowing through the pipe coils, thereby reducing the temperature difference which reaches a minimum in the middle of the regenerator. In contrast to this, the profile of the temperature differences of a known regenerator does not show a minimum value, but a maximum value exactly in the middle of the regenerator. This profile is represented by the dotted line in this diagram.

In the operation of the regenerators of this invention a warm gas is introduced into both opposite ends thereof in a first cycle. During this first cycle, warm gas flows through the bed of cooled particles in the regenerator and into indirect heat exchange relation with cool, clean gas flowing through the pipe coils. The impurities in the warm gas are condensed in the regenerator and the warm feed gas emerges therefrom as a cooled, clean gas. If desired, this effluent product can be recirculated through the coils in the regenerator.

After a period of operation during which the regenerator heat storage bodies are being warmed, the regenerator flow is reversed in a second cycle during which not only cooled gas is passed into the conduit intermediate the ends, but also cooled cleaned gas is flowing through the pipe coils. This cooled gas serves to recool the heat storage bodies. When the latter bodies reach a predetermined temperature, the gas flow is again reversed and operation, as in the above-described first cycle, is repeated.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In the process of operating a double-flow regenerator having a shell closed by two end heads, first conduit means on each of said end heads to carry warm fluid, second conduit means in said shell positioned intermediate of said end heads and serving to supply both cold fluid and for separate withdrawal of cold, cleaned fluid, said second conduit means being in simultaneous fluid flow communication with both of said first conduit means in said end heads and heat storage bodies disposed within said chamber substantially equally between each end and said second conduit means, indirect heat exchange means within said shell positioned both above and below said second conduit means in cold portions of the regenerator, the steps comprising concurrently introducing a warm fluid into both of said first conduit means to produce an effluent from said second conduit means of a cold, cleaned fluid, and simultaneously passing at least a portion of said cooled, cleaned fluid in parallel paths through said indirect heat transfer means, thereby to provide a regenerator temperature profile wherein small temperature differences between the regenerator and fluids flowing therethrough are obtained in both the cold and warm portions.

2. A double-flow regenerator having a shell closed by two end heads, first conduit means in each of said end heads to carry warm gas, second conduit means in said shell positioned intermediate of said end heads and serving both to supply cold gas and for separate withdrawal of cold, cleaned gas, said second conduit means being in simultaneous gas flow communication with both of said first conduit means in said end heads, and heat storage means disposed within said chamber substantially equally between each end and said second conduit, the improvement comprising, indirect heat exchange means positioned within the shell both above and below said second conduit means in cold portions of the regenerator for effecting indirect heat exchange in parallel paths between cool, clean gas therein derived from the second conduit means and warm gas in the regenerator, said indirect heat exchange means being closer to said second conduit means than to said first conduit means thereby to provide a regenerator temperature profile wherein small temperature differences between the warm gas and the cold gas flowing therethrough in a subsequent cycle are obtained in both the cold portions and the warmer ends.

3. The double-flow regenerator of claim 2 wherein said indirect heat exchange means are pipe coils through which a cooled, cleaned gas is flowing countercurrently to the gas being cooled and cleaned in the regenerator.

4. The double-flow regenerator according to claim 3 wherein the pipe coils have inlets and outlets external to the shell and positioned substantially one above the other.

5. A double-flow regenerator having a shell closed by two end heads, first conduit means in each of said end heads to carry warm gas, second conduit means in said shell positioned intermediate of said end heads and serving both to supply cold gas and for separate withdrawal of cold, cleaned gas, said second conduit means being in simultaneous gas flow communication with both of said first conduit means in said end heads, and heat storage means disposed within said chamber substantially equally between each end and said second conduit, the improvement comprising, indirect heat exchange means positioned within the shell both above and below said second conduit means in cold portions of the regenerator and effecting indirect heat exchange in parallel path between cool, clean gas therein derived from the second conduit means and warm gas in the regenerator, thereby to provide a regenerator temperature profile wherein small temperature differences between the warm gas and the cold gas flowing therethrough in a subsequent cycle are obtained in both the cold portions and the warmer ends, said indirect heat exchange means comprising pipe coils arranged around a short inner conduit positioned concentrically about the longitudinal axis of the regenerators.

6. A double-flow regenerator according to claim 5, said inner pipe being fixedly connected at its lower end to one of two ends of at least three trusses extending radially from said inner pipe adjacent to the regenerator shell, the other ends of the trusses being connected by means affixed to the shell.

7. A double-flow regenerator according to claim 6, further comprising vertically upwardly extending web means being mounted on said trusses, at predetermined spacing, and branches of the individual pipe coils being fastened to these webs, one below the other.

8. A double-flow regenerator according to claim 7 wherein the webs are spaced from each other at a distance sufficient to permit heat storage bodies introduced into the regenerators to fall through the shell between the pipe coils.

9. A double-flow regenerator according to claim 8 wherein the webs positioned closest to the regenerator shell are fixedly connected with a narrow ring concentric about the longitudinal axis of the regenerators, and uniform spacer means affixed to the external circumference of said ring serves to uniformly space the webs from the regenerator shell.

References Cited

UNITED STATES PATENTS

| 2,460,859 | 2/1949 | Trumpler | 62—14 |
| 2,663,168 | 12/1953 | Schilling | 62—13 |
| 2,735,278 | 2/1956 | Rice | 62—13 |
| 2,895,304 | 7/1959 | Wucherer et al. | 62—13 |

FOREIGN PATENTS

| 884,203 | 7/1949 | Germany. |
| 1,100,661 | 3/1961 | Germany. |

NORMAN YUDKOFF, *Primary Examiner.*

V. W. PRETKA, *Assistant Examiner.*

U.S. Cl. X.R.

62—38